US005770811A

United States Patent [19]

Haino

[11] Patent Number: 5,770,811

[45] Date of Patent: Jun. 23, 1998

[54] MUSIC INFORMATION RECORDING AND REPRODUCING METHODS AND MUSIC INFORMATION REPRODUCING APPARATUS

[75] Inventor: Yasuyuki Haino, Yokosuka, Japan

[73] Assignee: Victor Company of Japan, Ltd., Yokohama, Japan

[21] Appl. No.: 741,668

[22] Filed: Oct. 31, 1996

[30] Foreign Application Priority Data

Nov. 2, 1995 [JP] Japan .................................... 7-309986
Nov. 24, 1995 [JP] Japan .................................... 7-329664

[51] Int. Cl.[6] ........................................ G09B 15/02

[52] U.S. Cl. .................. 84/464 R; 84/477 R; 434/307 A

[58] Field of Search ............................ 84/464 R, 477 R, 84/645; 434/307 A

[56] References Cited

U.S. PATENT DOCUMENTS 5,453,570 9/1995 Umeda et al. ............................ 84/636

FOREIGN PATENT DOCUMENTS 5-224587 9/1993 Japan .

*Primary Examiner*—William M. Shoop, Jr.
*Assistant Examiner*—Marlon T. Fletcher
*Attorney, Agent, or Firm*—Michael N. Meller

[57] ABSTRACT

A music information reproducing method and apparatus for reproducing music information containing character codes for displaying a plurality of characters on an optionally selected display screen of the apparatus and containing MIDI signals formatted on a basis of MIDI Standard. The MIDI signals contain timing clocks and sound source driving information for driving various sound sources and color change information containing color change timings for designating a character and its color change timing of the designated character. The positions of the characters displayed on the display screen are preliminarily determined by the apparatus before the music information is reproduced thereby, and the color change of the characters designated by the color change information is conducted in synchronization with the timing clocks of the MIDI signals by using the determined positions of the characters.

8 Claims, 9 Drawing Sheets

MUSIC INFORMATION RECORDING AND REPRODUCING METHODS AND MUSIC INFORMATION REPRODUCING APPARATUS

BACKGROUND OF THE INVENTION

1. Field of the Invention

This invention relates to methods and apparatuses for recording and reproducing music information containing display information regarding displayed characters and MIDI signals, particularly, relates to methods and apparatuses suitable for recording and reproducing music information used in a KARAOKE player for reproducing KARAOKE music information containing color change of displayed characters of words or lyrics of the KARAOKE song.

2. Description of the Related Arts

Generally, in music reproducing apparatuses such as KARAOKE players seen in bar rooms and homes, desired songs are preliminarily recorded in recording mediums such as an optical disc or a CD (compact disc), wherein information regarding a desired song contains accompaniment music-information, background picture-information and lyric (words) character-infromation. In a well known KARAOKE player, when a desired song is selected by a user, a background picture is displayed on a screen such as a TV monitor (monitor) together with characters of the words of lyric and with an accompaniment melody in such a manner that colors of the characters sequentially change as the accompaniment melody progresses, so as to allow the user to sing along the melody easily promoted by the color changing words.

In this KARAOKE player, if a desired song is not prerecorded in a disc or a CD, it can not be available. Further, it will cost very much to install rarely requested songs together with the frequently desired songs in the recording mediums.

Furthermore, when a new song emerges, it will takes some times, for instance, of several months, before the new song is released in a form of a CD or a disc, because of a necessary lead time of production of the CD or the disc including containing such as a mastering process. Thus, the user has to wait for a long time before the CD or a disc containing the new song becomes available.

As a countermeasure to eliminate the above-mentioned disadvantages, there has been developed recently a communication KARAOKE system. In the communication KARAOKE system, an information center as a music provider stores a vast variety of music information regarding not only already released songs but also new songs ready to be released on the basis of a database, and selectively provides, upon request basis, songs with related information to users' KARAOKE players through telephone lines.

Each of users selects a desired song among the songs with related information transmitted therefrom. In other words, the users subscribe the desired song or a group of songs through their telephone lines.

As KARAOKE players used in the communication KARAOKE system, there are two types, i.e., a non-accumulation type KARAOKE player and an accumulation type KARAOKE player. In the non-accumulation type one, when the user selects a desired song, the information of the selected song is only transmitted to the KARAOKE player of the user from the information center. In the accumulation type one, the KARAOKE player of the user is equipped with a recording medium such as a hard disc having a large storage capacity, in which the information regarding the songs used frequently are preliminarily recorded via telephone lines from the information center. A desired song is selected from the songs recorded in the hard disc by the user. This accumulation type KARAOKE player is more popular today because of a less cost for the telephone communication compared with that of the non-accumulation type one. In this accumulation type one, the necessary data are transmitted through the telephone lines and are stored in the recording medium at a time, for instance, in the night, when the telephone lines is not congested. Thus, the data to be recorded in the recording medium can be preliminarily updated every day or as requested.

On one hand, electric instruments such as a synthesizer and an electric piano have greatly advanced in quality of sounds generated from artificial sound sources due to an advancement of technology. As a standard for controlling and driving such sound sources of the electric instruments, there is a well-known MIDI (Musical Instrument Digital Interface) Standard.

It is possible to transmit electric instrument control signals effectively conforming to the MIDI Standard. Accordingly, as the music information for the communication KARAOKE system, there is employed a music information transmitting system conforming to the MIDI Standard. This music information contains character codes corresponding to a title of a song and words of lyric, and music information in accordance with the MIDI Standard.

On the other hand, in the KARAOKE player, the colors of characters corresponding to the words are successively changed as the accompaniment melody progresses to allow the user to sing along readily. Accordingly, the color change data for the characters are very important in the KARAOKE player. However, it is necessary to reduce a transmission amount of the color change data because they are usually quite large.

Next, a description is given of an example of a color change processing method in the prior art with respect to a series of Japanese HIRAKANA (phonetic) characters [あいうえお] disposed in a line direction on a screen of a terminal unit referring to FIG. 1

FIGS. 1(A) and 1(B) are graphs for explaining a processing method for changing colors of the characters of the words in the prior art.

As shown in FIG. 1(A), a screen of a terminal unit is composed of 720×480 picture elements formed in a matrix having plural lines of 480 in a horizontal direction and plural columns of 720 in a vertical direction, and a location on the screen is represented on the basis of one picture element unit.

Specifically, each of the series of Japanese HIRAKANA characters あいうえお has 120 picture elements, and the series thereof is disposed at a center of the screen in a line direction being interposed between a right margin and a left margin each having 60 picture elements in the line direction.

When the series of the characters is disposed in the line direction, the color change thereof is successively performed only in the line direction and not in the column direction. Thus, hereinafter, a number of picture elements is defined as a number of picture elements in the line direction, and a number of picture elements in a column direction is omitted for simplicity.

The color change information to be transmitted is such information as an inflection point where a speed of the color change is abruptly altered, which the inflection point is related to timing clocks used in the MIDI signals. Specifically, when a number $t_0$ of the timing clocks is counted, the inflection point $P_0$ is present at a position of a 60th picture element on the screen, and when a number $t_1$ of the timing clocks is counted, the inflection point P1 is present at a position of a 180th picture element.

This relation between the inflection point and the number of timing clocks is shown in FIG. 1 (B).

This color change information is transmitted as table information to the terminal unit of the user. In the terminal unit, the color change information is stored in a predetermined storage device in a form of a table, and the color change of the characters displayed is successively performed referring to the table in accordance with the accompaniment melody.

Further, in the terminal unit, the speed of the color change of the character interposed between the adjacent inflection points is made to be constant. For instance, as to the picture elements between the adjacent inflection points $P_0$, $P_1$, 120 picture elements undergo the color change in a period of counting a number $(t_1-t_0)$ of the timing clocks. Thus, $120/(t_1-t_0)$ picture elements are color-changed at every timing clock. Specifically, after a number $t_0$ of the timing clocks is counted up, the picture elements from 60th to 180th are color-changed at a speed of $120/(t_1-t_0)$ picture elements per one timing clock in synchronization with the timing clocks. Accordingly, when the timing clocks of $(t_1-t_0)$ have been counted, the color change of the first character (あ) is over. After that, the color change of the second character (い) of which the picture elements are located within an area P1 to P2 (corresponding to picture elements of from the 180th to the 300th), is successively conducted at a color change speed of $(300-180)/(t_2-t_1)$ in synchronization with the timing clocks. In the same manner as mentioned above, the color changes are conducted with respect to the characters (う), (え) and (お). Thus, the series of the characters is successively color-changed from a left to right direction in accordance with the accompaniment melody in a good timing.

In the abovementioned communication KARAOKE system, however, the color change information is constructed under an assumption that the terminal units to be used are made only for this purpose. The reason is that it is possible for an exclusive terminal unit to reduce an amount of music data transmitted from the information center because sizes of the screen and the characters displayed thereon, a number of picture elements for constituting a character, and the display positions of the characters are handled as fixed values. Thus, it is impossible to apply the color change information to other types of terminal unit than the exclusive one.

However, there is a demand for applying the color change information to such optional terminal units as used by personal computer users, wherein the sizes of the screen and the characters displayed therein, the number of picture elements for constituting a character, and the display position of the character have to be handled as optional ones.

Further, recently, there is an OS (operating system) capable of displaying a plurality of divided subscreens (windows) in a main screen and capable of executing a program at every window, wherein the sizes of the windows are optionally determined by the user. Thus, the number of the picture elements constituting a character is different corresponding to the size of the window.

When the sizes of the screen and the characters displayed thereon, the number of picture elements for constituting a character, and the display positions of the characters are optional, it is impossible to perform the color change of the characters correctly by using the abovementioned color change information.

SUMMARY OF THE INVENTION

Accordingly, a general object of the present invention is to eliminate the disadvantages stated in the foregoing.

Another object of the present invention is to provide music information recording and reproducing methods and apparatuses capable of color-changing the characters correctly even when the display positions of the characters and the size of the character are optionally selected.

A specific object of the present invention is to provide a music information reproducing method for reproducing music information by a music information reproducing apparatus, the music information containing character codes for displaying a plurality of characters on display means and MIDI signals formatted on a basis of MIDI Standard, the MIDI signals containing timing clocks and sound source driving information for driving various sound sources and color change information containing color change timings for designating a character to be color-changed and a color-change timing of thus designated character of the plurality of characters, wherein positions of the plurality of characters displayed on the display means are preliminarily determined by the music information reproducing apparatus before the music information is reproduced therefrom, and a color change of the characters designated by the color change information is conducted in synchronization with the timing clocks of the MIDI signals by using determined positions of the plurality of characters.

A more specific object of the present invention is to provide a music information reproducing apparatus for reproducing music information containing character codes for displaying a plurality of characters on display means and MIDI signals formatted on a basis of MIDI Standard, the MIDI signals containing timing clocks and sound source driving information for driving various sound sources and color change information containing color change timings for designating a character to be color-changed and a color-change timing of the characters, the apparatus comprising: the display means having a screen having a plurality of picture elements; display processing means for converting the character codes into picture element data so as to display the picture element data on the display means as characters; sound driving means for driving the various sound sources of various music instruments based on the sound source driving information; character information storage means for storing the positions of the plurality of characters displayed on the display means; and color change processing means for driving the display processing means in such a manner that the color change of the character designated by the color change information is conducted in synchronization with the timing clocks of the MIDI signals.

Another and specific object of the present invention is to provide a music information recording method for recording music information containing character display information for displaying a plurality of characters on predetermined display means, sound source driving information for driving various sound sources and color change information for color-changing the characters displayed on the displaying means, wherein the color change information is recorded being represented by both a color change command for designating a certain character to be color-changed among the characters displayed on the display means and time information for representing a timing of executing the color change command.

Another and more specific object of the present invention is to provide a music information reproducing method for reproducing music information by a music information reproducing apparatus, the music information containing character display information for displaying a plurality of characters on display means, sound source driving information for driving various sound sources and color change information for color-changing the plurality of characters displayed on the displaying means, wherein positions of the plurality of characters displayed on the display means are preliminarily determined by the music information reproducing apparatus before the music information is reproduced therefrom and a color change of the plurality of characters designated by the color change information is conducted by using determined positions of the plurality of characters.

Another and more specific object of the present invention is to provide a music information reproducing apparatus for reproducing music information containing character display information for displaying a plurality of characters on display means, sound source driving information for driving various sound sources and color change information for color-changing the plurality of characters displayed on the displaying means, the apparatus comprising: the display means having a screen of a plurality of picture elements; display processing means for converting the character codes into picture element data so as to display the picture element data on the display means as characters; sound driving means for driving the various sound sources of various instruments based on the sound source driving information; character information storage means for storing positions of the plurality of characters displayed on the display means; and color change processing means for driving the display processing means in such a manner that the color change of the character designated by the color change information is conducted in synchronization with timing clocks included in the music information.

Other objects and further features of the present invention will be apparent from the following detailed description.

DETAILED DESCRIPTION OF THE PREFERRED EMBODIMENTS

[First embodiment]

A description is given of a first embodiment of the present invention referring to FIGS. 2 to 5, wherein the color change is conducted at every character of the words.

Figure 2:
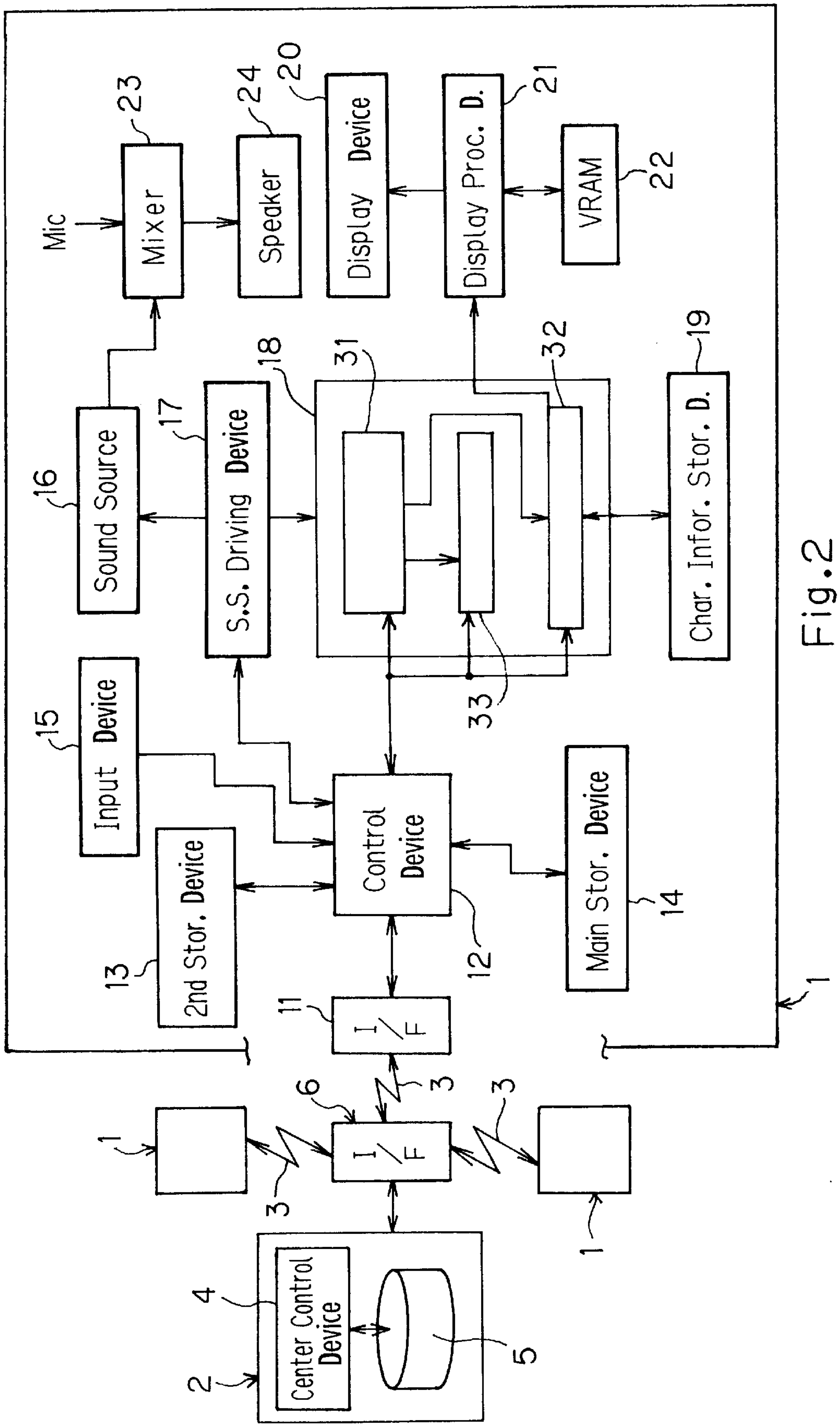
FIG. 2 is a block diagram of a music information reproducing system of a first embodiment of the present invention.

FIG. 2 is a block diagram of a music information reproducing system of a first embodiment of the present invention.

As shown in FIG. 2, as a terminal unit, a music information reproducing apparatus 1 of the first embodiment of the present invention is connected to an information center 2 through telephone lines 3.

The information center 2 has a center storage device 5 having a large storage capacity controlled under a center control device 4. In the center control device 4, there are memorized music information regarding the KARAOKE songs (referred to as KARAOKE music information) as a database. Further, a plurality of the music information reproducing apparatuses 1 are connected to the information center 2 through interfaces 6 and telephone lines 3. When a desired KARAOKE song is requested by a user through his music information reproducing apparatus 1, the center control device 4 retrieves the KARAOKE music information of the KARAOKE song requested by the user from the center storage device 5 in which a large amount of KARAOKE music information is stored, and the requested KARAOKE music information is transmitted to the corresponding music information reproducing apparatus 1.

Next, a description is given of the abovementioned KARAOKE music information.

Figure 3A:
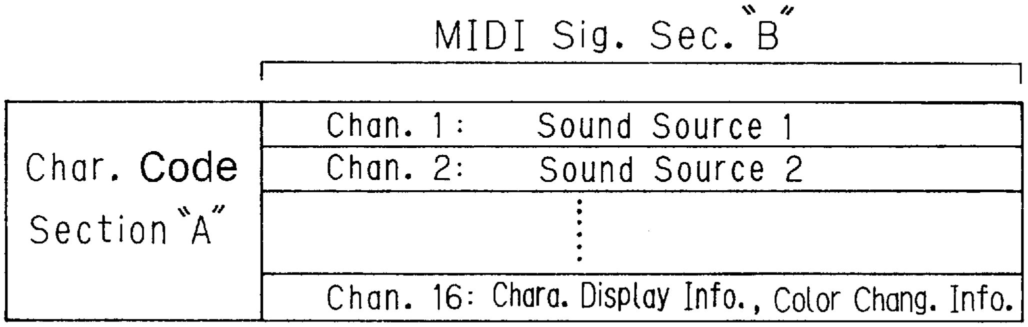
FIGS. 3(A) and 3(B) are charts for explaining the KARAOKE music information to be reproduced in the music information reproducing apparatus in a first embodiment of the present invention.
Figure 3B:
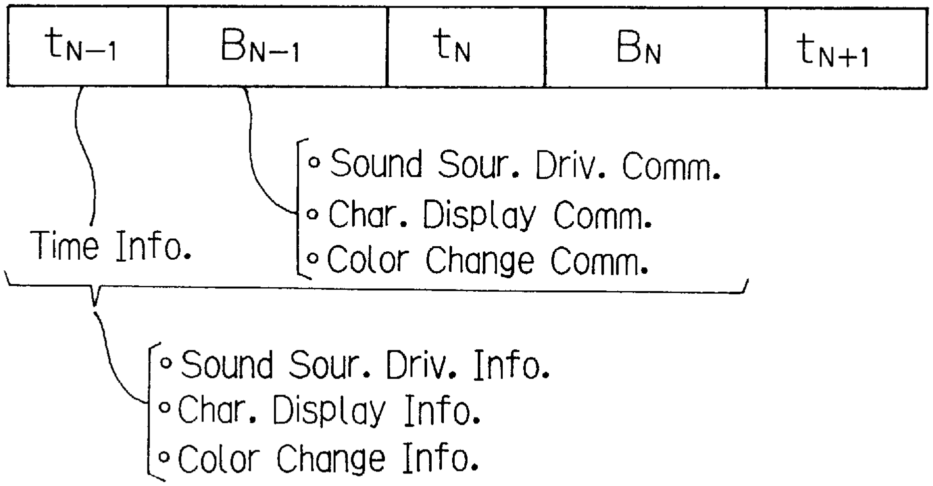

FIGS. 3(A) and 3(B) are charts for explaining the KARAOKE music information reproduced in the music information reproducing apparatus in a first embodiment of the present invention.

As shown in FIG. 3(A), the KARAOKE music information contains a character code section "A" and a MIDI signal section "B".

The KARAOKE music information contains also various control signal sections, a chorus information section and a background picture information section other than the character code section "A" and the MIDI signal section "B", however, they are omitted in FIG. 3(A) for simplicity.

The character code section "A" holds the title and the characters of the words of one KARAOKE song in a form of, for instance, the JIS code.

The character code section "A" is composed of a plurality of pages for one full song, each holds a group of the character codes of the title and words to be simultaneously displayed on a screen except for the color which changes character by character.

Further, the MIDI signal section "B" holds sound source driving commands for playing an accompaniment melody of a KARAOKE song by driving MIDI sound sources of the music information reproducing apparatus 1, character display commands for displaying and erasing the pages of the character code section "A", and color change commands for changing the color of the characters displayed. These commands are formatted conforming to the MIDI Standard.

In this embodiment, the sound source driving commands are respectively allotted to channels 1 to 15 corresponding to the sound sources, and the character display commands and the color change commands are allotted to the channel 16.

The MIDI signal section "B" has a structure shown in FIG. 3(B).

In FIG. 3(B), a control command $B_N$ represents any one of the sound source driving command, the character display command and the color change command.

Each of the sound source commands designates a sound source and a sound to be played or to be stopped. Each of the character display commands designates a page to appear or to disappear. Each of the color change commands designates a character line and an orderly number of a character in the designated character line to be color-changed.

Just before the control command $B_N$, there is presented time information $t_N$ represented by a number of clocks in the MIDI signal to be counted before executing the control command $B_N$. Similarly, time information $T_{N-1}$ and $T_{N-1}$ are provided before the control commands $B_{N-1}$ and $B_{N-1}$ (not shown).

Accordingly, the sound source information, the character display information and the color change information are respectively formed by being combined with the respective time information as above.

Referring to FIG. 2 again, the music information reproducing apparatus 1 comprises a control device 12 connected to the telephone lines 3 through an interface 11, a secondary storage device 13 for storing KARAOKE music information of reserved KARAOKE songs, a main storage device 14 for storing KARAOKE music information to be played, an input device 15 for designating a KARAOKE song to be reserved and a size of a screen, sound sources 16 as various music instruments, a sound source driving device 17 for driving the sound sources 16, a character color change processing device 18 for processing the color change of the characters displayed, a character information storage device 19 for storing display information (displayed positions, character sizes to be displayed) determined by the color change processing device 18, a display device 20 such as a CRT (cathode ray tube) display having a screen composed of a plurality of picture elements, a display processing device 21 for displaying characters and a background image on the screen of the display device 20, and a VRAM (Video RAM) 22 for storing and displaying picture element data on the screen of the display device 20.

The secondary storage device 13 is required to have a storage capacity large enough to store the KARAOKE music information corresponding to the reserved KARAOKE songs. Thus, it is composed of a storage device having a large storage capacity such as a hard disc drive (HDD). The storage condition of the KARAOKE music information in the secondary storage device 13 is controlled by the control device 12 and the titles of the KARAOKE songs stored in the secondary storage device 13 can be displayed on the display device 20 by the control device 12.

Further, the main storage device 14 has a storage capacity large enough to store the KARAOKE music information corresponding to one KARAOKE song. Thus, it is composed of a RAM (Random Access Memory) or a free area of the secondary storage device 13. The character information storage device 19 is also composed of a RAM or a free area of the secondary storage device 13 as well as the main storage device 14.

The sound sources 16 are provided for various instruments such as drums, bases, and guitars used for playing an accompaniment melody, and can be driven by the sound source driving information according to the MIDI Standard. Each of the sound sources 16 is controlled by sound source deriving information derived from the channels 1 to 15 of the MIDI signals.

Further, the character color change processing device 18 comprises a clock count section 31, a character display processing section 32 and a color change processing section 33.

The clock count section 31 counts the timing clocks used in the MIDI signals so as to determine a page display/erase timing and a character color change timing.

The character display processing section 32 determines a display position of each of characters displayed on the screen of the display device 20, and stores them in the character information storage device 19, and displays or erases a page depending on an output from the clock count section 31.

From the character information storage device 19, the color change processing section 33 reads out the display position of the character designated by the color change command responsive to the output from the clock count section 31, and outputs it to the display processing device 21 so as to perform the color change of the designated character.

Figure 4:
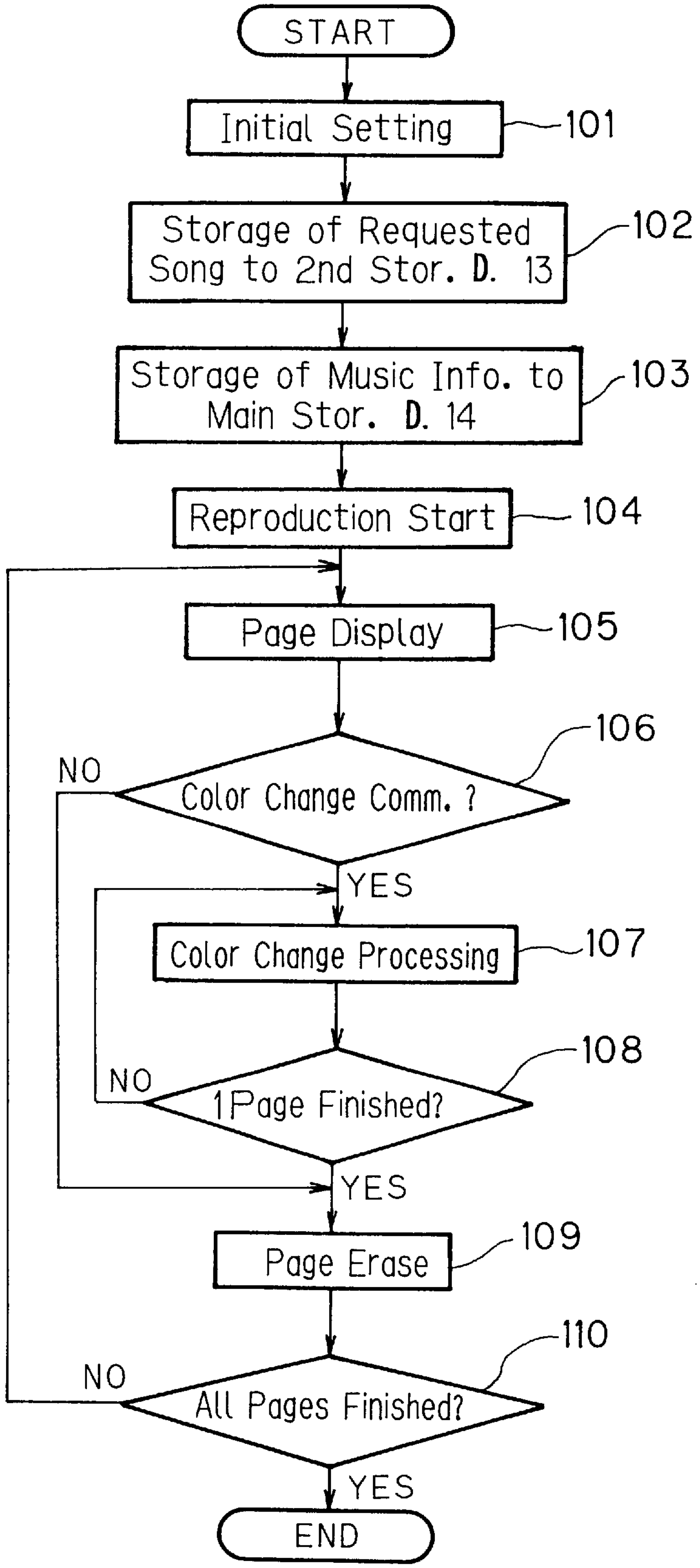
FIG. 4 is an operation flow chart of the music information reproducing apparatus shown in FIG. 2.

Next, a description is given of an operation of the music information reproducing apparatus 1 referring to a flow chart shown in FIG. 4.

FIG. 4 is an operation flow chart of the music information reproducing apparatus 1 shown in FIG. 2.

In FIG. 4, a reference character 101 denotes a step of "Initial setting", 102 "Storage of a requested song to a secondary storage device 13", 103 "Storage of KARAOKE music information to be reproduced to the main storage device 14", 104 "Starting reproduction", 105 "Display of a page", 106 "Is color change command present?" 107, "Color change processing", 108 "If 1 page has finished?", 109 "Erasing the page", 110 "If all the pages have finished?".

Figure 1A:
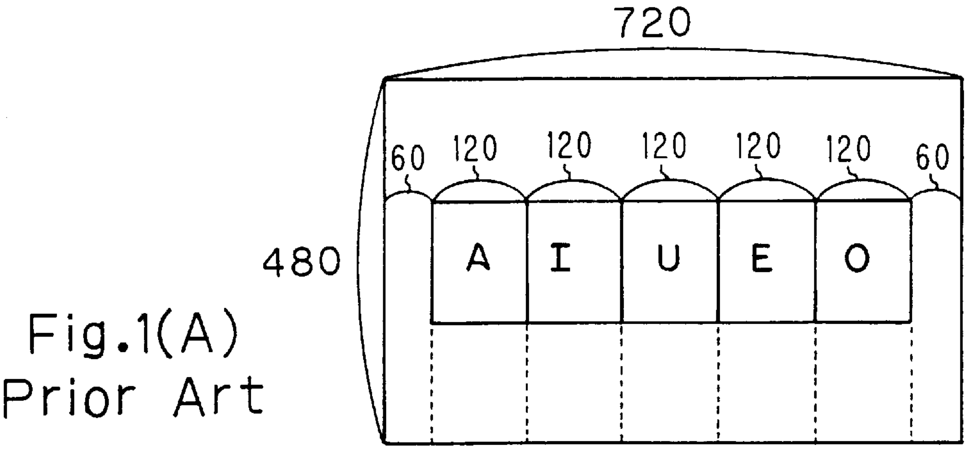
Fig.1(A) Prior Art
FIGS. 1(A) and 1(B) are graphs for explaining a processing method for changing colors of the characters of the words in the prior art.
Figure 1B:
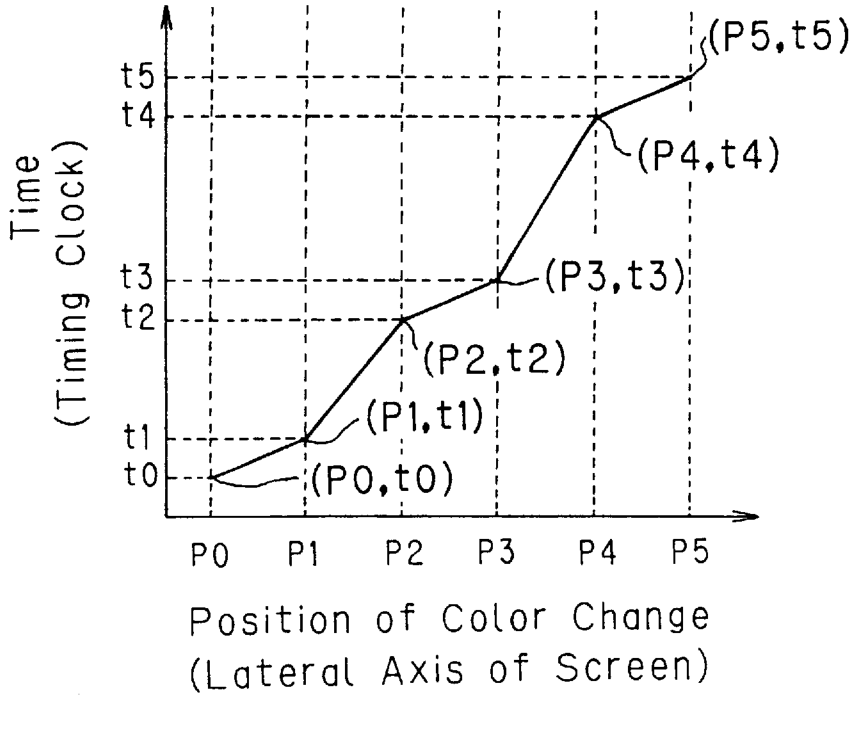
Fig.1(B) Prior Art

The following explanation is given to a case where the color change is conducted with respect to a series of Japanese HIRAKANA characters [あいうえお] displayed on the screen having a plurality of picture elements 720×480 in the display device 20 as shown in FIGS. 1(A) and 1(B).

First, before reproducing the KARAOKE music information, a size of the screen (a number of picture elements of columns×lines) is set up by manipulating the input device 15 (step 101). After the size of the screen has been set up, the control device 12 transmits the information to the character display processing section 32 of the character color change processing device 18 to cause the character display processing section 32 to determine a size of a character "S" and positions "P" of the characters.

Here, a maximum character number "M" capable of being displayed in a line, and a maximum line number "L" capable of being displayed in a column direction on the screen are predetermined. Accordingly, by the character display processing section 32, a number of picture elements "X" in a line direction and a number of picture elements "Y" in a column direction, i.e., a character size "S" (a number of picture elements of columns×lines), and positions "P" of the characters are determined so that all the characters can be displayed as a series of characters in the condition of the maximum character number "M" within one line (character line) and the maximum number "L" of such character line in the column direction in the established screen.

In other words, a size of a character is determined based on a size of the set up screen and the maximum character number "M" capable of being displayed in a line, and a position "P" of a head character of each line is determined based on the size of the inputted screen and the determined size of the character. From the position "P" of the head character and the character size "S", each of the character positions is obtained and is stored in the character information storage device 19.

As long as the initial setting performed at a step 101 is performed prior to the reproduction of the KARAOKE music information, this setting is possible at either an initial set up operation of the music information reproducing apparatus 1 itself or a part of initial set up operation for playing the KARAOKE music information.

Next, at a step 102, when a KARAOKE song is requested by a user through the input device 15, the control device 12 refers the KARAOKE music information stored in the secondary storage device 13. If the requested song is not stored therein, the control device 12 calls for the requested song to the information center 2 through the telephone lines 3, and stores the KARAOKE song transmitted from the information center to the secondary storage device 13. Then, the control device 12 transfers the requested KARAOKE song to the main storage device 14 (step 103), and a sound reproduction of the KARAOKE song is started (step 104).

When the sound reproduction of the KARAOKE song is started, the control device 12 transmits the sound source driving information (time information and sound source driving commands) of the channels 1 to 15 in the MIDI signal section "B" (FIG. 3(A)) to the sound source driving device 17. Thereby, the sound source driving device 17 drives various sound sources 16 corresponding to the time information and the sound source commands of the channels 1 to 15, and the accompaniment melody of the KARAOKE song is thus outputted from a speaker 24 through a mixer 23.

At the same time, the control device 12 transmits the character display information and the character color change information (channel 16 of the MIDI signal section "B") to the character color change device 18 so as to cause it to display a title of the KARAOKE song and characters of the words thereof on the screen (step 105).

Before the KARAOKE accompaniment melody is started or just after it has started, the title of the KARAOKE song is displayed on the screen. The character codes of the title are provided as a page "0" in the character code section "A" (FIG. 3(A)) of the KARAOKE music information. Accordingly, the page "0" is designated by the character display command which is transmitted at first Just after the reproduction has started.

Generally, a time interval before executing of a control command is provided by the time information placed ahead the control command to be executed as mentioned in the foregoing. However, in order that the title is displayed before the reproduction is started or just after the reproduction has started, this time interval as the time information (counted value of the timing clock) is made "0". Thus, the character display processing section 32 is driven as soon as the character display information is received.

Through the control device 12, the character display processing section 32 reads out the character codes on the page "0" from the main storage device 14 and the character size "S" and the character position "P" from the character information storage device 19 as well, and transmits them to the display processing device 21 to drive thereof. The display processing device 21 translates the transmitted character codes into picture element data based on the character size "S" and the display position "P" and stores them in the VRAM 22. Thus, the characters on the page "0" are displayed on the screen of the display device 20 through the VRAM 22.

Next, the control device 12 identifies whether the next control command is a page command or a color change command (step 106).

Generally, the characters of the title are erased without the color change. Thus, the next control command corresponds to a character erase command. Accordingly, the operation proceeds from the step 106 to the step 109. After the clock counting section 31 has counted the timing clock by "t" represented by the time information, the page "0" displayed on the display device 20 is erased by the display processing device 21.

After that, at a step 110, determination of whether all the pages are finished, is made. However, when the next control command (character display command) is follows, which indicates that all the pages are not finished, the operation returns to the step 105.

At the step 105, the next page "1" (words No. 1) is displayed.

Just after the title has been erased at the step 109, the clock count section 31 starts counting the timing clocks. When the counted values reach to a count value "t" representing a time interval, the page 1 designated by the character display command is displayed by causing the character display processing section 32 to drive. The character display processing section 32 transmits the character codes of the page 1 stored in the main storage device 14 to the display processing device 21 together with the character display position "P" and the character size "S" stored in the character information storage device 19. Thus, the series of HIRAKANA characters [あ い う え お] as shown in FIG. 1(A) is displayed on the screen of the display device 20 .

As the subsequently transmitted command is a color change command, the operation proceeds from the step 106 to the step 107. Then, the characters displayed on the display device 20 undergoes the color change processing.

When the control device 12 detects the color change information, the control device 12 transmits the time information to the clock count section 31 as well as the color change command to the color change processing section 33.

After the clock count section 31 has counted the timing clocks of the MIDI signals by a count number representing a time interval, the clock count section 31 drives the color change processing section 33.

Hence, a first character in a first line is designated to be color-changed by a color change command.

Specifically, the color change processing section 33 reads out a display position P1 of a character [あ] (shown in FIG. 1(A)) corresponding to the first character in the first line, and a display position P2 of a next character [い] (shown in FIG. 1(A)) from the character information storage device 19, and transmits them to the display processing device 21 so as to change colors of the picture element of the character stored in the VRAM 2 corresponding to the display positions P1 to P2 on the screen by driving the display processing device 21.

As a result, for instance, the character [あ] among a series of characters in a white color is timely changed into a green color in correspondence with the KARAOKE accompaniment melody.

Figure 5:
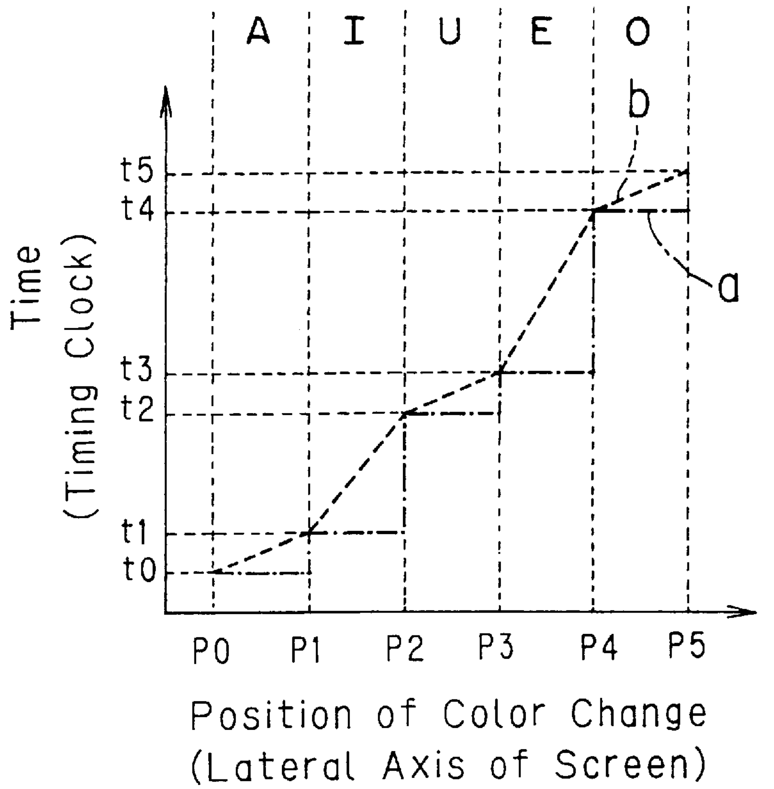
FIG. 5 is a graph for explaining a color change method in the music information reproducing apparatus shown in FIG.2.

Regarding the color change method, there are two methods that a character is color-changed momentary at a color change timing as shown with chain-dotted lines "a" in FIG. 5, and that a character is color-changed at a constant speed during a period from a color change timing to a next color change timing in a right-hand direction as shown with dotted lines "b".

FIG. 5 is a graph for explaining color change methods in the music information reproducing apparatus 1 shown in FIG. 2.

Referring to FIG. 5 as shown with the chain-dotted lines "a", when a character is color-changed instantaneously, a provision of the display position "P" of a character enables to conduct the color change processing at the step 107 shown in FIG. 4.

However, as shown with the dotted lines "b", when a character is color-changed at a constant speed from a left-hand top to a right-hand direction, color change speed information is required in a color change processing of the step 107. This color change speed information can be preliminarily stored in the character information storage device 19 together with the display position P of the character by being calculated at the initial setting, or can be obtained by causing the color change processing section 33 to calculate it during an operation of the color change processing.

The above color change speed information can be calculated when the character size "S" and a time required to color-change are given. Thus, at the step of 101, when the character size "S" is determined, the channel 16 of the MIDI signal section "B" is read out from the main storing device 14, and a number of the picture elements to be color-changed per one clock of the timing clock is calculated by using the color change information.

Specifically, as shown in FIG. 3(B), time information $t_N$ placed Just before a certain color change command (control command) $B_N$ represents a time interval before executing the color change command $B_N$. Thus, by using time information $t_{N+1}$ of a color change command $B_{N+1}$ which follows the color change command $B_N$, a value $S/t_{N+1}$ is calculated as the color change speed of the character designated by the color change command $B_N$. And at the step 106, from the color change processing section 33 the color change speed $S/t_{N+1}$ as well as the display position "P" is transmitted to the display processing device 21. The display processing device 21 color-changes picture element data of the picture element area designated in the VRAM 22 at the color change speed of $S/t_{N+1}$.

The color change processing is conducted with respect to the following characters [い], [う], [え], [お] in the same manner as mentioned above (step 108). When the color changes of all the characters on the page have been finished, the page is erased by a page erase information (step 109). This color change processing is conducted on all the pages (step 110). When all the pages have finished, the processing is completed.

As the above character color change processing can be conducted irrespective of the size of the screen, it is possible to conduct an accurate color change even when a window screen, of which a size and a display position on a screen are optionally determined, is employed.

When the abovementioned character color change processing is conducted on such a window screen, it is possible to recognize the size and the display position of the window screen at the completion of setting of the window screen. Thus, at an initial setting operation, the size of the character and the display position "P" of each of the characters can be determined by using the above recognized information.

In other words, according to the color change processing in the first embodiment of the present invention, the color change of the words of the KARAOKE song can be conducted correctly irrespective of the size of the screen. Accordingly, it is possible not only to optionally select the terminal unit but also to perform an accurate color change of the words of the KARAOKE song on the window screen of which the size and the display position are optionally changed.

Further, in the above embodiment, the words of the KARAOKE song are color-changed of every character, however, it is possible to color-change a whole line of characters simultaneously at a color change timing of a first character in the line. Furthermore, it is possible to color-change a plurality of characters (one word) simultaneously. For instance, this method is applicable to the character color change of the words written in English, wherein a plurality of letters can be changed at the same time without giving an unnatural impression to the users. This method contributes to reduce an amount of information to be handled.

According to the music information reproducing method of the first embodiment of the present invention, positions of the characters displayed on the display device are determined before the music information is reproduced, and the color change of the characters designated by the color change information is conducted in synchronization with the timing clocks of the MIDI signals by using the positions of the characters determined before the music information is reproduced. Thus, it is possible to conduct color-changes of the characters displayed on a screen correctly in synchronization with driving of the sound sources even when the position of the character displayed on the screen and the size of the character are optionally changed.

[Second embodiment]

A description is given of a second embodiment of the present invention referring to FIGS. 6 to 10, wherein the color change is conducted at every character of the words.

Figure 6:
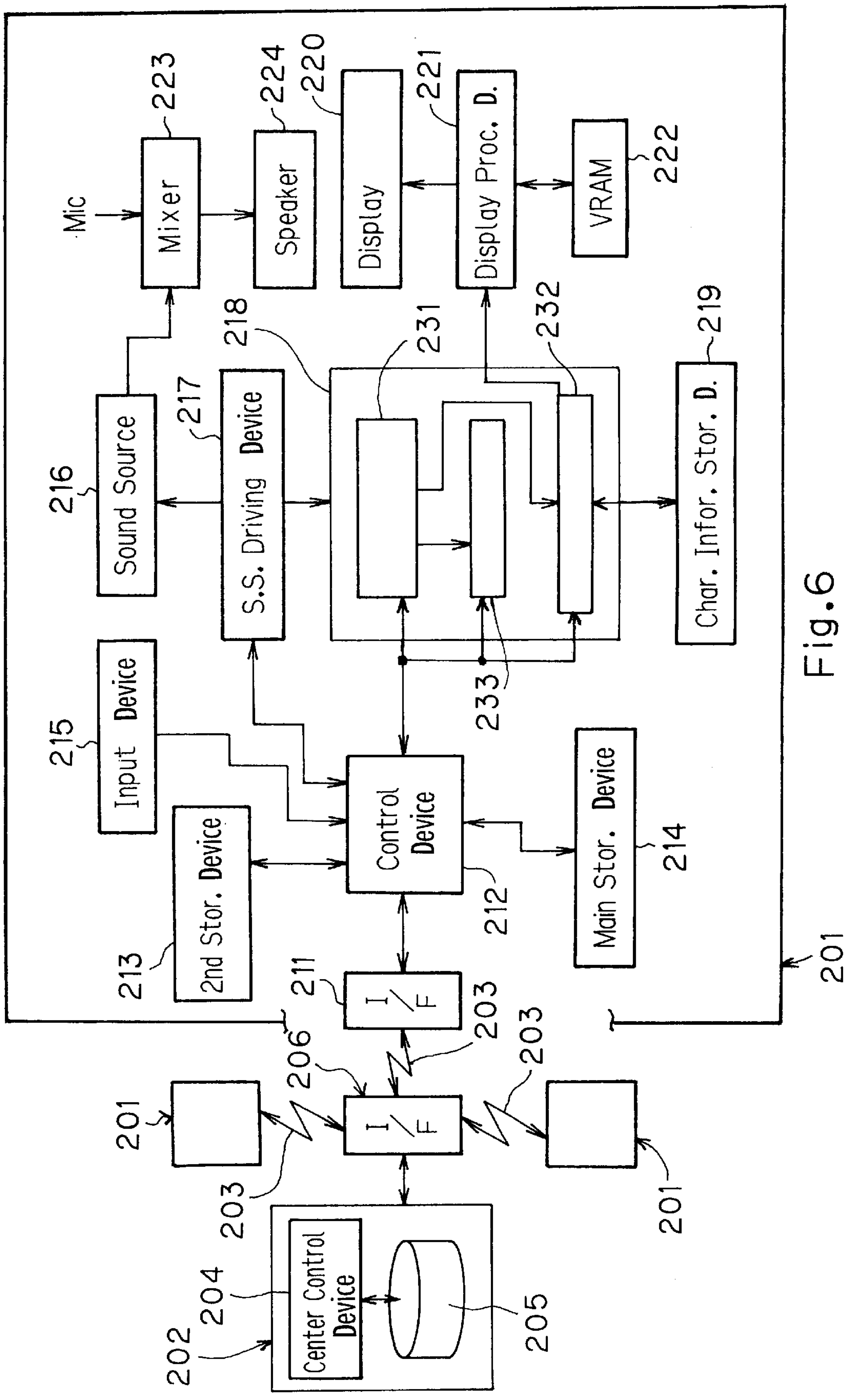
FIG. 6 is a block diagram of a music information reproducing system of the second embodiment of the present invention.

FIG. 6 is a block diagram of a music information reproducing system of the second embodiment of the present invention.

As shown in FIG. 6, as a terminal unit, a music information reproducing apparatus 201 of the second embodiment of the present invention is connected to an information center 202 through telephone lines 203.

The information center 202 has a center storage device 205 having a large storage capacity controlled under a center control device 204. In the center control device 204, there are stored music information regarding the KARAOKE songs (referred to as KARAOKE music information) on the basis of a database. Further, a plurality of the music information reproducing apparatuses 201 are connected to the information center 202 through interfaces 206 and telephone lines 203. When a desired KARAOKE song is requested from a music information reproducing apparatus 201, the center control device 204 retrieves the KARAOKE music information according to the requested KARAOKE song from the center storage device 205 in which a large amount of KARAOKE music information is stored, and the requested KARAOKE music information is transmitted to the corresponding music information reproducing apparatus 201.

Next, a description is given of the abovementioned KARAOKE music information stored in the center storing device 205 of the information center 202.

FIGS. 7 (A) to 7(D) are charts for explaining the music information reproduced in the music information reproducing apparatus in the second embodiment of the present invention.

Figure 7A:
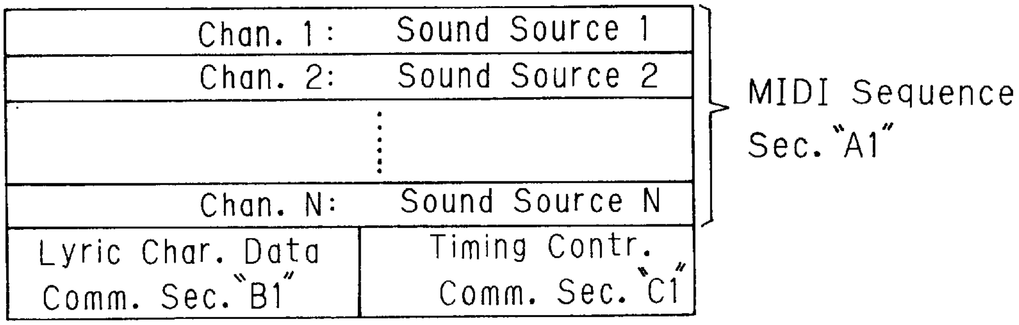
FIGS. 7(A) to 7(D) are charts for explaining the music information to be reproduced in the music information reproducing apparatus in the second embodiment of the present invention.

As shown in FIG. 7(A), the KARAOKE music information has an MIDI sequence section "A1", a lyric character data command section "B1" and a timing command section "C1".

The KARAOKE music information contains also various control signal sections, a chorus information section and a background picture information section other than the above information, however, they are omitted in FIG. 7(A) for simplicity.

The MIDI sequence section "A1" is a part where sound source driving commands for playing an accompaniment melody of a KARAOKE song are formatted on conforming the MIDI Standard. The MIDI sequence section "A1" has N channels in which the sound source driving commands for driving the sound sources are described respectively. These commands are provided for generating sounds by designating the sound sources and kinds of sounds, and time information for representing a starting timing of a sound is provided in front of each of the commands. Thus, each of the sound source driving command plays a role together with the time information.

The lyric character data command section "B1" is a part where such commands as representing lyric character codes and display information, and character display information such as character data are described.

Figure 7B:
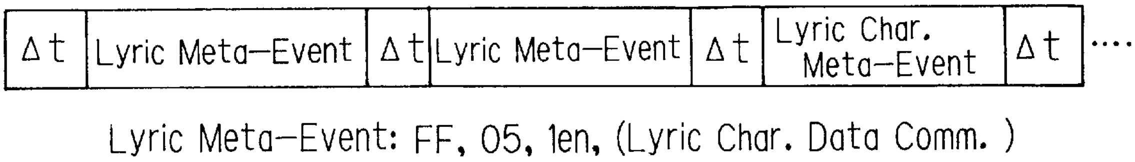

In this lyric character data command section "B1", there are described various commands represented by lyric meta-events defined by SMF (Standard MIDI File) in a form of, for instance, [FF, 05, len, (lyric character data command)] as shown in FIG. 7(B).

Incidentally, a symbol Δt placed before the lyric meta-event is required in the MIDI Standard. However, it is impertinent to a reproduction, thus, the explanation thereof is omitted here. In the exemplified command, the "FF" represents a meta-event, "05" a code number of the meta-event, and "len" a total length of following lyric character data command by a number of bite.

Further, as the lyric character data commands, there are a page designating command for designating a page number, a character line designating command for designating a character line number (line number), a display position designating command for designating a display starting position of a series of characters, a character attribute command for designating a character attribute, a character color designating command for designating a specified color of the characters before and after the color change of the characters is conducted, a character outline color designating command for designating a colored outline of the characters before and after the color change of the characters is conducted, a scroll command for designating a scroll of the characters, a fade-in command for designating fade-in of the characters, a fade-out command for designating fade-out of the characters, a time unit command for designating a unit of time information in Sequencer-Specific meta-events which will be explained hereinafter, and a lyric character data command for designating lyric character data.

And, character codes of a title and lyric characters of the KARAOKE song are described on the basis of shift JIS codes. Following a lyric character command, character codes of a series of characters displayed on a line are described.

These lyric character codes of which characters are simultaneously displayed on a screen, are arranged as a page unit by the page designating command.

Figure 7C:
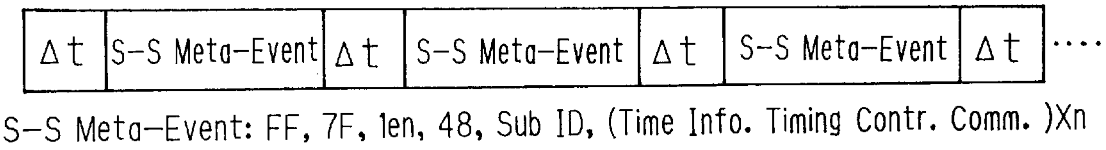

Further, the timing control command section "C1" is a part where such commands as designating a timing of display or erase of a page, designating a timing of color change start or finish of displayed characters and designating a line of lyric characters are held. As shown in FIG. 7(C), in this timing control command section "C1", there are held Sequencer-Specific meta-events (referred to as S-S meta-event hereinafter) defined by the SMF. For instance, an S-S meta-event is described as [FF, 7F, len, 48, Sub ID, (time information, timing control command)×n]. Wherein a symbol Δt placed before the S-S meta-event is the same as that of the lyric character data command "B1". Further, the "7F" designates a code showing the S-S meta-event, and the "len" a byte number of a total length of following data ([48, Sub ID, (time information, timing control command)×n]). The "48" designates a manufacturer ID defined by the MIDI Standard, and the "Sub ID" a code thereof. The detailed description thereof are omitted here.

In the timing control command section "C1", there have a page command for designating a display start or an erase of a page designated by the lyric character data command in the section "B1", a line designating command for designating a line number on a displayed page, a color change command for designating a character to be color-changed and a start and finish thereof. The page display or erase of the lyric characters, and the color change of the lyric characters displayed are conducted by designating these commands.

Figure 7D:
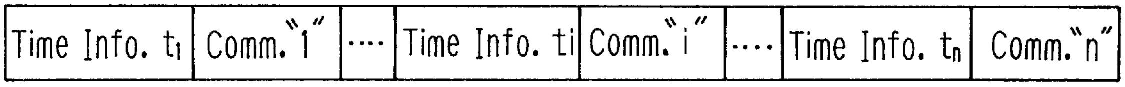

Further, as shown in FIG. 7(D), the aforementioned information of "time information, timing control command" is described in such a manner that a plurality of timing control commands are recorded in an S-S meta-event. As an example of the color change command, assuming that the number of the lyric characters in a line is to be "n", "n" sets, each composed of both a piece of time information and a timing command per a character, are described subsequent to the "Sub ID".

Like this, a plurality of commands are described in an S-S meta-event, resulting in a reduction of an amount of information. This is suitable for transmitting the KARAOKE music information through the telephone lines.

Further, the time information described before the timing control command represents a relative time with respect to the preceding command (a first time information designates a time from a start of the KARAOKE song), and they are represented by a value having a unit time defined by the time unit command of the lyric character data command in the section "B1". The unit time defined by the time unit command is determined so that one unit time has several clocks of the timing clock defined in the MIDI sequence section "A1". Specifically, when one unit time designated by the time unit command has, for instance, "k" clocks, after the timing clocks of $t_1$×k has been counted from a predetermined moment, the timing control command "i" is executed, and after the timing clocks of $t_{i+1}$×k have been counted, the timing control command "1+l" is executed.

As mentioned above, the time information "$t_i$" described before the timing control command "i" designates a relative time to the preceding timing control command thereof. Further, the page command with the time information represents the page display information, and the color change command with the time information represents the color change information.

In this embodiment, as the KARAOKE music information stored in the center storage device 205 designates a position of a character to be color-changed with respect to a line and an ordinal number thereof, i.e., a position of one of the characters displayed, it is necessary to convert a display position of the designated character into a coordinate of the screen of the music information reproducing apparatus 201. However, it is possible to color-change the character in a correct timing even when a size of the screen is optionally changed.

Referring to FIG. 6 again, the music information reproducing apparatus 201 comprises a control device 212 connected to the telephone lines 203 through an interface 211, a secondary storage device 213 for storing KARAOKE music information of reserved KARAOKE songs, a main storage device 214 for storing KARAOKE music information to be played, an input device 215 for designating a KARAOKE song to be reserved and a size of a screen, sound sources 216 as various music instruments, a sound source driving device 217 for driving the sound sources 216, a character color change processing device 218 for processing the color change of the characters displayed, a character information storage device 219 for storing display information (display positions, character sizes) determined by the color change processing device 218, a display device 220 such as a CRT (cathode ray tube display having a screen composed of a plurality of picture elements, a display processing device 221 for displaying characters and a background image on the screen of the display device 220, and a VRAM (Video RAM) 222 for storing and displaying picture element data on the screen of the display device 220.

The secondary storage device 213 is required to have a storage capacity large enough to store the KARAOKE music information corresponding to the reserved KARAOKE songs. Thus, it is composed of a storage device having a large storage capacity such as a hard disc drive (HDD). The storage condition of the KARAOKE music information in the secondary storage device 213 is controlled by the control device 212 and the titles of the KARAOKE songs stored in the secondary storage device 213 can be displayed on the display device 220 by the control device 212.

Further, the main storage device 214 has a storage capacity large enough to store the KARAOKE music information corresponding to one KARAOKE song. Thus, main storage device 214 is made of a RAM (Random Access Memory) or a free area of the secondary storage device 213. The character information storage device 219 is also made of a RAM or a free area of the secondary storage device 213 as well as the main storage device 214.

The sound sources 216 are provided for various music instruments such as drums, bases, and guitars to play accompaniments melody, and can be driven by the sound source driving information according to the MIDI Standard. Each of the sound sources 216 is controlled by sound source driving information derived from the channels N in the MIDI sequence section "A1".

Further, the character color change processing device 218 comprises a clock count section 231, a character display processing section 232 and a color change processing section 233.

The clock count section 231 counts the timing clocks of the MIDI sequence section "A1" so as to determine a page display/erase timing and a character color change timing.

The character display processing section 232 determines the display position of each of characters displayed on the screen of the display device 220, and stores them in the character information storage device 219, and displays or erases a page depending on an output from the clock count section 231.

From the character information storage device 219, the color change processing section 233 reads out the display position of the character designated by the color change command responsive to the output from the clock count section 231, and outputs it to the display processing device 221 so as to perform the color change of the designated character.

Figure 8:
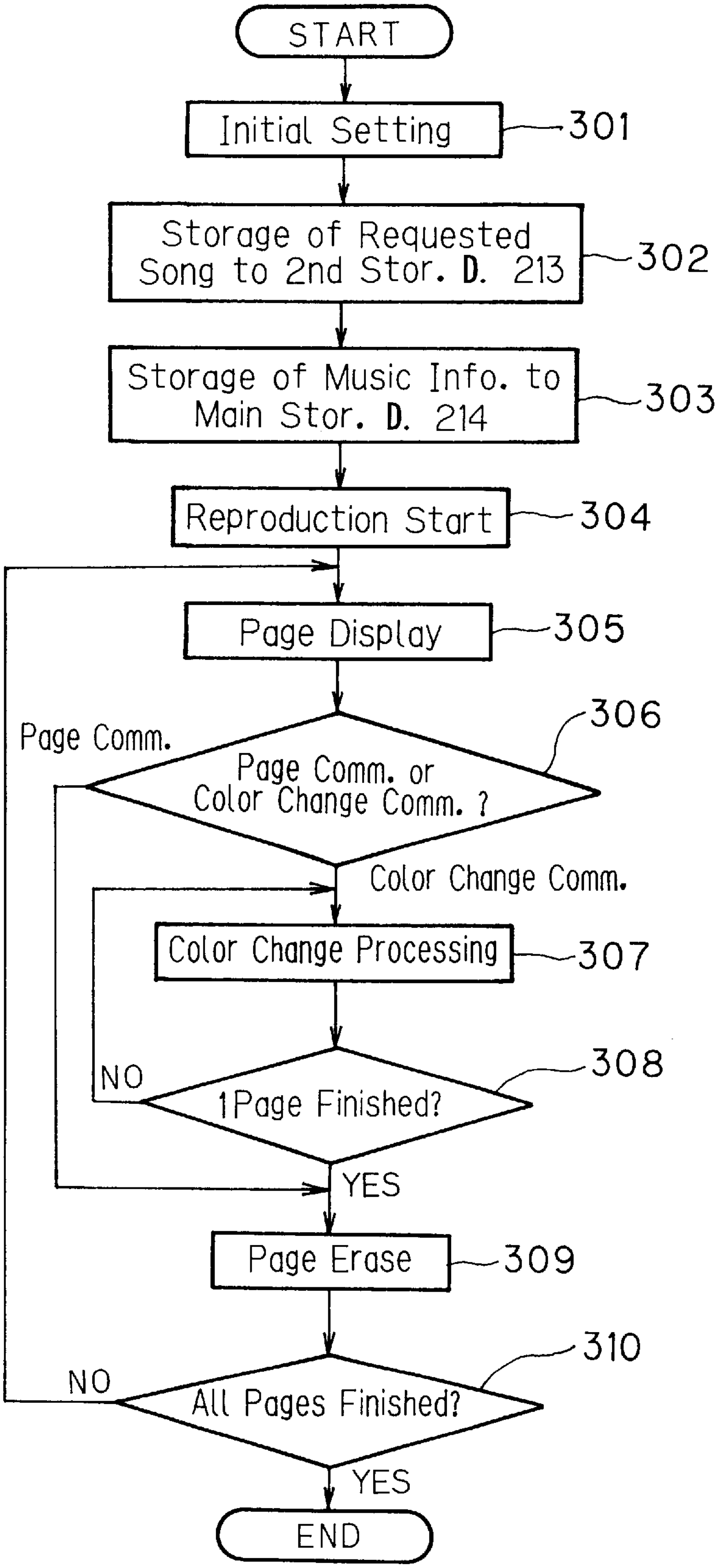
FIG. 8 is an operation flow chart of the music information reproducing apparatus shown in FIG. 6 in the second embodiment of the present invention.

Next, a description is given of an operation of the music information reproducing apparatus 201 referring to a flow chart shown in FIG. 8.

FIG. 8 is an operation flow chart of the music information reproducing apparatus 201 shown in FIG. 6 in the second embodiment of the present invention.

In FIG. 8, a reference character 301 denotes a step of "Initial setting", 302 "Storage of a requested song to the secondary storage device 213", 303 "Storage of KARAOKE music information to the main storage device 214", 304 "Starting reproduction", 305 "Display of a page", 306 "Is color change command present?", 307 "Color change processing", 308 "If 1 page has finished?", 309 "Erasing the page", 310 "If all the pages have finished?".

The following explanation is given to a case where the color change is conducted with respect to a series of Japanese HIRAKANA characters [あいうえお] displayed on the screen having a plurality of picture elements 480×720 in the display device 220 as shown in FIGS. 1(A) and 1(B).

First, before reproducing the KARAOKE music information, a size of the screen (a number of picture elements of columns×lines) is set up through the input device 215 (step 301). After the size of the screen has been set up, the control device 212 transmits the information to the character display processing section 232 of the character color change processing device 218 to cause the character display processing section 232 to determine the size of the character "S" and the positions "P" of the characters.

Here, a maximum character number "M" capable of being displayed in a line, and a maximum line number "L" capable of being displayed in a column direction on the screen are predetermined. Accordingly, by the character display processing section 232, a number of picture elements "X" in a line direction and a number of picture elements "Y" in a column direction, i.e., a character size "S" (a number of picture elements of columns x lines), and positions "P" of the characters are determined so that all the characters can be displayed as a series of characters in the condition of the maximum character number "M" within one line (character-line) and the maximum number "L" of such character line in the column direction in the established screen.

In other words, a size of a character is determined based on a size of the set up screen and the maximum character number "M" capable of being displayed in a line, and a position "P" of a head character of each line is determined based on the size of the set up screen and the determined size of the character. From the position "P" of the head character and the character size "S" , each of character positions is obtained and is stored in the character information storage device 219.

As long as the initial setting performed in a step 301 is conducted prior to the reproduction of the KARAOKE music information, this setting is possible at either an initial set up operation of the music information reproducing apparatus 201 itself or a part of initial operation for playing the KARAOKE music information.

Next, at a step 302, when a KARAOKE song is requested by a user through the input device 215, the control device 212 refers the KARAOKE music information stored in the secondary storage device 213. If the requested song is not stored therein, the control device 212 calls for the requested song to the information center 202 through the telephone lines 203, and stores the KARAOKE song transmitted from the information center 202 to the secondary storage device 213. Then, the control device 212 transmits the requested KARAOKE song to the main storage device 214 (step 303), and the reproduction of the KARAOKE song is started (step 304).

When the reproduction of the KARAOKE song is started, the control device 212 transmits the sound source driving information (time information and sound source driving commands) of the MIDI sequence section "A1" to the sound source driving device 217. Thereby, the sound source driving device 217 drives various sound sources 216 corresponding to the time information and the sound source driving commands of the channels 1 to 15, and the accompaniment melody of the KARAOKE song is thus outputted from a speaker 224 through a mixer 223.

At the same time, the control device 212 transmits the lyric character data command section "B1" and the timing control command section "C1" to the character color change device 218 so as to cause it to display a title of the KARAOKE song and characters of the words thereof on the screen (step 305).

Before the KARAOKE accompaniment melody is started or just after the KARAOKE accompaniment has been started, the title of the KARAOKE song is displayed on the screen. The character codes of the title are provided as a page "0" in the lyric character data command section "B1" of the KARAOKE music information. Accordingly, the page "0" is designated by the character display command which is transmitted at first just after the reproduction has started.

Generally, a time interval before executing a control command is provided by the time information placed ahead the control command to be executed. However, as the title is displayed before the reproduction is started or just after the reproduction has started, this time interval as the time information (counted value of the timing clock) provided ahead the control command is made "0". Thus, the character display processing section 232 is driven as soon as the timing control command section "C1" is received.

Through the control device 212, the character display processing section 232 reads out the character codes in the page "0" from the main storage device 214 and the character size "S" and the character position "P" from the character information storage device 219 as well, and transmits them to the display processing device 221 to drive thereof. The display processing device 221 translates the transmitted character codes into picture element data on the basis of the character size "S" and the display position "P" and stores them in the VRAM 222. Thus, the characters on the page "0" are displayed on the screen of the display device 220 through the VRAM 222.

Next, the control device 212 identifies whether the next control command is a color change command or not (step 306).

Generally, the characters of the title are erased without the color change. Thus, the next control command corresponds to a character erase command. Accordingly, the operation proceeds from the step 306 to the step 309. After the clock counting section 231 has counted the timing clock by "t" represented by the time information, the page "0" displayed on the display device 220 is erased by the display processing device 221.

After that, at a step 310, a determination of if all the pages are finished, is made. However, when the subsequent control command (character display command) indicates that all the pages are not finished, the operation returns to the step 305.

At the step 305, the next page "1" (words No. 1) is displayed.

Just after the title has been erased at the step 309, the clock count section 231 starts counting the timing clocks. After the counting, the page 1 designated by the page command of the lyric character data command "B1" is displayed by causing the character display processing section 232 to drive. The character display processing section 232 transmits the character codes of the page 1 stored in the main storage device 214 to the display processing device 221 together with the character display position "P" and the character size "S" stored in the character information storage device 219. Thus, the series of HIRAKANA characters [あいうえお] as shown in FIG. 1(A) is displayed on the screen of the display device 220

As the subsequently transmitted command is a color change command, the operation proceeds from a step 306 to a step 307. Then, the characters displayed on the display device 220 undergoes the color change processing.

When the control device 212 detects the color change information, the control device 212 transmits the time information to the clock count section 231 as well as the color change command to the color change processing section 233.

After the clock count section 231 has counted the timing clock in the MIDI sequence section "A1" by a count number representing a time interval, the clock count section 231 drives the color change processing section 233.

Hence, a first character in a first line is designated to be color-changed by a color change command. The color change processing section 233 reads out a display position P1 of a character [あ] (shown in FIG. 1(A)) corresponding to the first character in the first line and a display position P2 of a next character [い] (shown in FIG. 1(A)) from the character information storage device 219, and transmits them to the display processing device 221 so as to change colors of the picture elements of the character stored in the VRAM 202 corresponding to the display positions P1 to P2 on the screen by driving the display processing device 221. As a result, for instance, the character [あ] among a series of characters in a white color is timely changed to a green color in correspondence with the KARAOKE accompaniment melody.

Figure 9:
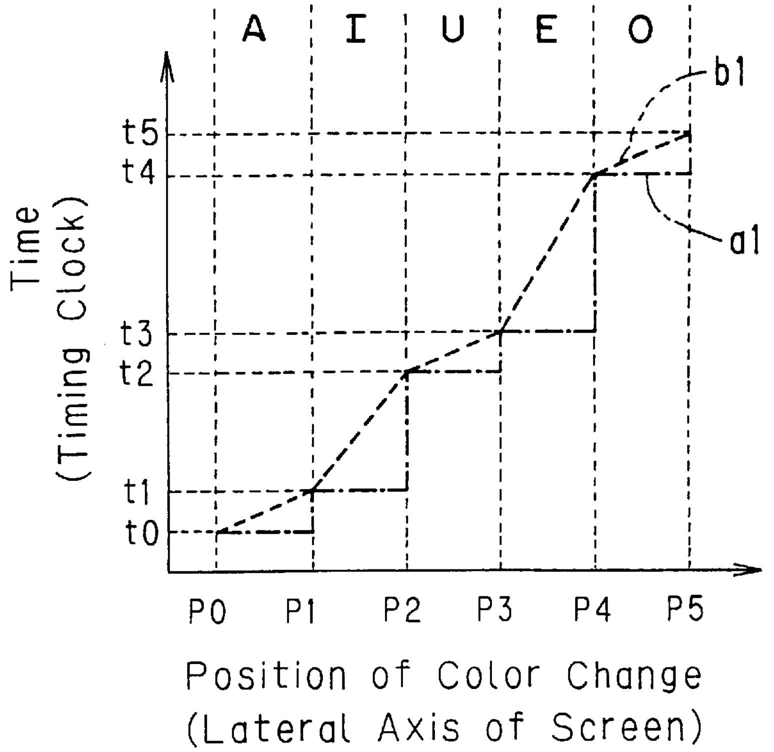
FIG. 9 is a graph for explaining a color change method in the music information reproducing apparatus shown in FIG. 6, and FIGS. 10(A) and 10(B) are charts for explaining another recording method of the third embodiment in the present invention.

Regarding the color change method, there are such methods that a character is color-changed instantaneously at a color change timing as shown with chain-dotted lines "a1" in FIG. 9, and that a color of a character is changed at a constant speed during a period from a color change timing to a next color change timing in a right-hand direction as shown with dotted lines "b1".

FIG. 9 is a graph for explaining color change methods in the music information reproducing apparatus 201 shown in FIG. 6.

Referring to FIG. 9, as shown with the chain-dotted lines "a1", when a character is color-changed momentary, a provision of the display position "P" of a character enables to perform the color change processing at the step 307 shown in FIG. 8.

However, as shown with the dotted lines "b1", when a character is color-changed at a constant speed from a left-hand top to a right-hand direction, color change speed information is required in a color change processing of the step 307. This color change speed information may be preliminarily stored in the character information storage device 219 together with the display position P of the character by being calculated at the initial setting, or may be obtained by causing the color change processing section 233 to calculate it during an operation of the color change processing.

The above color change speed information can be calculated when the character size "S" and a time required to color-change are given. Thus, at the step of 301, when the character size "S" is determined, the timing control command in the section "C1" of the KARAOKE music information is read out from the main storing device 214, and a number of the picture elements to be color-changed per one clock of the timing clock is calculated by using the color change information.

Specifically, as shown in FIG. 7(D), the time information $t_i$ placed just before a certain color change command (control command) "i" represents a time interval before executing the color change command "i". Thus, by using a time information $t_{i+1}$ of a color change command "i+1" which follows the color change command "i", a value $S/t_{i+1}$ is calculated as the color change speed of the character designated by the color change command "i". And at the step 306, from the color change processing section 233 the color change speed $S/t_{i+1}$ as well as the display position "P" is transmitted to the display processing device 221. The display processing device 221 color-changes the picture element are a designated in the VRAM 222 at the color change speed of $S/t_{i+1}$.

The color change processing is conducted with respect to the following characters [い], [う], [え], [お] in the same manner as mentioned above (step 308). When the color changes of all the characters on the page have been finished, the page is erased by a page erase information (step 309). This color change processing is conducted on all the pages (step 310). When all the pages have finished, the processing is completed.

The above character color change processing can be conducted irrespective of the size of the screen.

For instance, it is possible to perform an accurate color change even when a window screen, of which a size and a display position on a screen are optionally determined, is employed.

When the abovementioned character color change processing is conducted on such a window screen, it is possible to recognize the size and the display position of the window screen at the completion of setting of the window screen. Thus, at an initial setting operation, the size of the character and the display position "P" of each of the characters can be determined by using the above recognized information.

In other words, according to the color change processing in the second embodiment of the present invention, the color change of the words of the KARAOKE song can be conducted correctly irrespective of the size of the screen. Accordingly, it is possible not only to optionally select the terminal unit but also to perform an accurate color change of the words of the KARAOKE song on the window screen of which the size and the display position are optionally changed.

Further, in the above embodiment, the words of the KARAOKE song are color-changed of every character, however, it is possible to color-change a whole line of characters simultaneously at a color change timing of a first character in the line. Furthermore, it is possible to color-change a plurality of characters simultaneously. For instance, this method is applicable to the character color change of the words written in English, wherein a plurality of letters (one word) can be changed at the same time without giving an unnatural impression to users. This method contributes to reduce an amount of information to be handled.

[Third embodiment]

Next, the description is given of another recording method wherein a plurality of characters are made to a unit (word) to be color-changed at a color change timing.

Figure 10A:
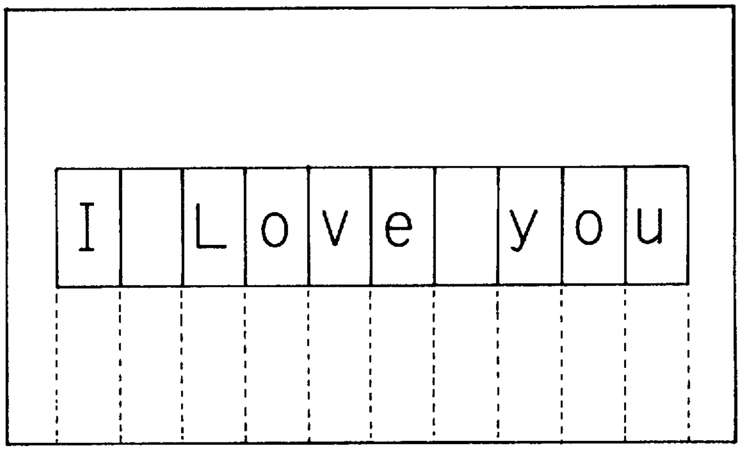
Figure 10B:
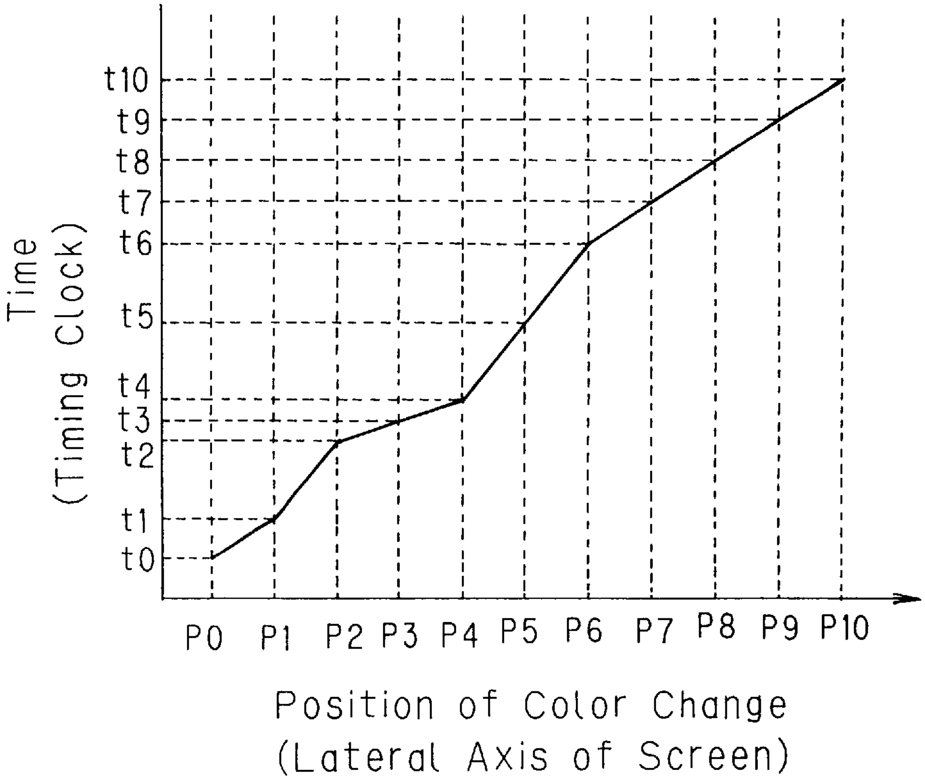

FIGS. 10(A) and 10(B) are charts for explaining another recording method of the third embodiment in the present invention.

As mentioned in the foregoing, in a case where the color change of the characters is conducted of every unit composed of a plurality of characters, it is effective to display the lyric characters in English. Thus, the description is given of a case in which a plurality of lyric characters, [I love you], are color-changed.

As shown in FIG. 10(A), in most cases a word written in English is composed of plural characters (alphabets) such as [love] and [you]. Further, a space is provided between adjacent words. Accordingly, as the space interposed between the adjacent words is counted as a character, 10 characters are thus to be disposed in a line in FIG. 10(A).

When the color change timing of characters is provided at every character as described in the recording method of the second embodiment, it is necessary to prepare color change timings such as a starting time "$t_0$" (FIG. 10(B)) of the first character [I], a starting time "$t_1$" of the second character "a space", a starting time "$t_2$" of the third character [L], . . . . . . . . . , and a finishing time "$t_{10}$" of the 10th character [u].

However, in an actual color change timings of the lyric character represented in English, most cases are that the color changes are conducted at a constant speed through a word or through plural characters as shown in FIG. 10(B).

For instance, actual time information required in the lyric characters in FIG. 10(B) is only $t_1$, $t_2$, $t_4$, $t_6$, and $t_{10}$. Thus, it is possible to conduct the color change processing in the terminal unit (the music information reproducing apparatus) by designating these color change timings and the characters.

In this embodiment, when the color change information containing the time information and the color change command is represented as [time information (clock) : a color change command (designated characters)], the required color change information of the lyric characters shown in FIG. 10(B) is [$t_0$ : a start of color change of a 1st character (I)], [$t_1$-$t_0$ : a to a start of color change of a space], [$t_2$−$t_1$: a start of color change of a 3rd c3 haracter (L)], [$t_4$−$t_2$ : a start of color change of a 5th character (v)], [$t_6$−$t_4$ : a start of color change of 7th character (u)], and [$t_{10}$−$t_0$ : a start of color change of a 10th character (u)]. Accordingly, it is not necessary to provide the color change information for every character, resulting in the reduction of an amount of data of the music information to be transmitted.

Further, when the space between words is designated to be color-changed by the color change information at a uniform speed, the color change speed information is represented by a value obtained by dividing a product of a number of characters existing between designated characters and the character size "S" by the time information. For instance, the color change speed information of [you] in the above the series of characters [I love you] is represented by $4\times S/(t_{10}-t_6)$. This calculation of the color change speed information is conducted at a step 301 of an initial operation as shown in FIG. 8. Then, the color change speed information is stored in the character information storage device 219, and is read out at a step 307 in the color change processing.

In this embodiment, the color timing change according to the color change information is performed on every character counting a space between words as well, however, it is possible to perform the color change timing on every words as one unit. For instance, the color change information in the case of designating the color change timing of the series of characters [I love you] shown in FIG. 10(A), is represented as [$t_0$: a start of color change of a 1st character (I)], [$t_1$−$t_0$ : an end of color change of the 1st character (I)], [$t_2$−$t_1$ : a start of color change of a 3rd character (L)], [$t_6$−$t_2$ : an end of color change of a 5th character (e)], [$t_7$−$t_6$: a start of color change of an 8th character (y)] and [$t_{10}$−$t_6$: an end of color change of a 10th character (u)]. Accordingly, it is not necessary to provide the color change information for every character, resulting in the reduction of an amount of data of the music information as well.

As seen from the above description, the color change information of the embodiment of the present invention is to designate any one ordinal unit to be color-changed or color-erased among the characters displayed on the display device 212. In other words, this invention employs a method to designate which character is started or terminated to be color-changed among a series of characters displayed on the display device 212. Accordingly, it is possible to designate a color change timing not only for every character but also for every unit of plural characters or a word.

According to the music information recording method of the present invention in which music information contains character display information for displaying a plurality of characters on a predetermined display device, sound source driving information for driving various sound sources and color change information for color-changing the characters displayed on the displaying device, the color change information is recorded by being represented by both a color change command for designating a certain character to be color-changed among the characters displayed on the display device and a piece of time information for representing a timing of executing the color change command. Thus, it is possible to color-change the characters timely in synchronization with driving of the sound sources irrespective of a size of a screen of a music information reproducing apparatus. Further, it is possible to designate a color change timing not only at every character but also at every unit of plural characters or a word because any one among the characters displayed on the display device is designated to be color-changed. This contributes to reduce an amount of data of the music information.

Further, according to the music information reproducing method of the present invention in which music information contains character display information for displaying a plurality of characters on a predetermined display device, sound source driving information for driving various sound sources and color change information for color-changing the characters displayed on the displaying device, the positions of the characters displayed on the display device are determined before reproducing and the color change of the characters designated by the color change information is conducted by using the determined positions of the characters. Thus, it is possible to realize the color change timely in synchronization with the driving of the sound sources even when the display positions of the characters and the sizes of the characters are changed.

What is claimed is:

1. A music information reproducing method for reproducing music information by a music information reproducing apparatus, said music information containing timing clocks; character display information for displaying a plurality of characters on display means; sound source driving information for driving various sound sources; and color change information for color-changing said plurality of characters displayed on said display means, the method comprising the steps of:

preliminarily determining and displaying positions of said plurality of characters on said display means by the character display information before said music information is reproduced;

counting said timing clocks of said music information, while said music information is reproduced; and changing the color of a whole line of said plurality of characters simultaneously at a color change timing of a first character in said line when the number of said timing clocks reaches a predetermined number designated by said color change information.

2. A music information reproducing method as claimed in claim 1, wherein said whole line is color-changed at a constant speed until a color change of the first character of the next succeeding line.

3. A music information reproducing method for reproducing music information by a music information reproducing apparatus, said music information containing timing clocks; character display information for displaying a plurality of characters on display means; sound source driving information for driving various sound sources; and color change information for color-changing said plurality of characters displayed on said display means, the method comprising the steps of:

preliminarily determining and displaying positions of said plurality of characters on said display means by the character display information before said music information is reproduced;

counting said timing clocks of said music information while said music information is reproduced; and, changing the color of one character of said plurality of characters when the number of said timing clocks reaches a predetermined number designed by said color change information.

4. A music information reproducing method as claimed in claim 3, wherein said character is color-changed at a constant speed during a period from one color change timing to the next color change timing.

5. A music information reproducing apparatus for reproducing music information containing timing clocks; character display information for displaying a plurality of characters; sound source driving information for driving various sound sources; and color change information for color-changing said plurality of displayed characters, the apparatus comprising:

display means for displaying said plurality of characters and having a screen of a plurality of picture elements;

display processing means for converting said character display information into picture element data to display said picture element data on said display means as characters;

a plurality of sound sources capable of providing sounds of a plurality of musical instruments;

sound driving means for driving said plurality of sound sources of various musical instruments based on said sound source driving information;

character information storage means for storing positions of said plurality of characters displayed on said display means; and color change processing means for changing the color of a whole line of said plurality of characters simultaneously at a color change timing of a first character in said line after calculating a position of the line and the color change timing by using said color change information and the positions of said characters stored in said character information storage means and counting said timing clocks of said music information while said music information is reproduced.

6. A music information reproducing apparatus as claimed in claim 5, wherein said whole line is color-changed at a constant speed until a color change of the first character of the next succeeding line.

7. A music information reproducing apparatus for reproducing music information containing timing clocks; character display information for displaying a plurality of characters; sound source driving information for driving various sound sources; and color change information for color-changing said plurality of characters the apparatus comprising:

display means for displaying said plurality of characters and having a screen of a plurality of picture elements;

display processing means for converting said character display information into picture element data to display the picture element data to display the picture element data on said display means as characters;

a plurality of sound sources capable of providing sounds of a plurality of musical instruments;

sound driving means for driving said plurality of sound sources of various musical instruments based on said sound source driving information;

character information storage means for storing positions of said plurality of characters display on said display means; and color changing processing means for changing the color of one character of said plurality of characters at a color change timing after calculating the color change position of said character and the color change timing by using said color change information and positions of said plurality of characters stored in said character information storage means and counting said timing clocks of said music information while said music information is reproduced.

8. A music information reproducing method as claimed in claim 7, wherein said character is color-changed at a constant speed during a period from one color change timing to the next color change timing.

* * * * *